United States Patent
Marupaduga et al.

(10) Patent No.: US 9,107,038 B1
(45) Date of Patent: Aug. 11, 2015

(54) ROAMING CONTROL SYSTEM AND METHOD FOR A ROAMING WIRELESS COMMUNICATION DEVICE

(71) Applicant: Sprint Communications Company L.P., Overland Park, KS (US)

(72) Inventors: Sreekar Marupaduga, Overland Park, KS (US); Nicholas David Kullman, Vashon, WA (US)

(73) Assignee: Sprint Communications Company L.P., Overland, KS (US)

(*) Notice: Subject to any disclaimer, the term of this patent is extended or adjusted under 35 U.S.C. 154(b) by 36 days.

(21) Appl. No.: 14/066,288

(22) Filed: Oct. 29, 2013

(51) Int. Cl.
  *H04W 4/00* (2009.01)
  *H04W 24/00* (2009.01)
  *H04W 8/02* (2009.01)
  *H04W 48/16* (2009.01)

(52) U.S. Cl.
  CPC ............ *H04W 8/02* (2013.01); *H04W 48/16* (2013.01)

(58) Field of Classification Search
  None
  See application file for complete search history.

(56) References Cited

U.S. PATENT DOCUMENTS

| | | | | |
|---|---|---|---|---|
| 5,153,902 | A | * 10/1992 | Buhl et al. | 455/432.1 |
| 7,720,474 | B2 | * 5/2010 | Gouthama et al. | 455/433 |
| 2002/0187793 | A1 | * 12/2002 | Papadimitriou et al. | 455/458 |
| 2006/0135160 | A1 | 6/2006 | Jiang | |
| 2009/0061854 | A1 | 3/2009 | Gillot et al. | |

FOREIGN PATENT DOCUMENTS

| | | |
|---|---|---|
| EP | 1763963 | 5/2006 |
| WO | 2006055629 | 5/2006 |

* cited by examiner

*Primary Examiner* — Erika A Washington

(57) ABSTRACT

A roaming control system and method for a roaming WCD while roaming away from the home wireless access network are provided. The roaming control system in one example embodiment includes a communication interface configured to exchange communications with the WCD and with other wireless access networks and a processing system coupled to the communication interface, with the processing system configured to ping the roaming WCD at predetermined time intervals, if the ping was successful, record a WCD roaming location using a ping response, if the ping was successful, provide WCD roaming control information to a visited wireless access network where the roaming WCD is currently located, and if the ping was unsuccessful, then broaden a search scope and repeat the pinging.

19 Claims, 5 Drawing Sheets

ROAMING CONTROL SYSTEM AND METHOD FOR A ROAMING WIRELESS COMMUNICATION DEVICE

TECHNICAL BACKGROUND

Cellular telephones offer many advantages; the greatest of which is mobility. A cellular telephone user can communicate with other persons and devices while on the go, and in most geographic locations.

The mobility advantage is even greater when the cellular telephone user travels out of his or her home location. When the cellular telephone user leaves a home network, he or she can roam in other cellular telephone networks. Optimally, the only discernible difference is the billed cost of roaming communications.

However, a difficulty in obtaining service can occur when roaming. This is especially true when the cellular telephone user is roaming in another country, geographic region, or continent. Such long-distance roaming can lead to difficulties in establish communications when the user has to get service access to a wireless network having different protocols, different service type, and different service providers.

OVERVIEW

A roaming control system and method for a roaming WCD while roaming away from the home wireless access network are provided. The roaming control system in one example embodiment includes a communication interface configured to exchange communications with the WCD and with other wireless access networks and a processing system coupled to the communication interface, with the processing system configured to ping the roaming WCD at predetermined time intervals, if the ping was successful, record a WCD roaming location using a ping response, if the ping was successful, provide WCD roaming control information to a visited wireless access network where the roaming WCD is currently located, and if the ping was unsuccessful, then broaden a search scope and repeat the pinging.

DETAILED DESCRIPTION

Figure 1:
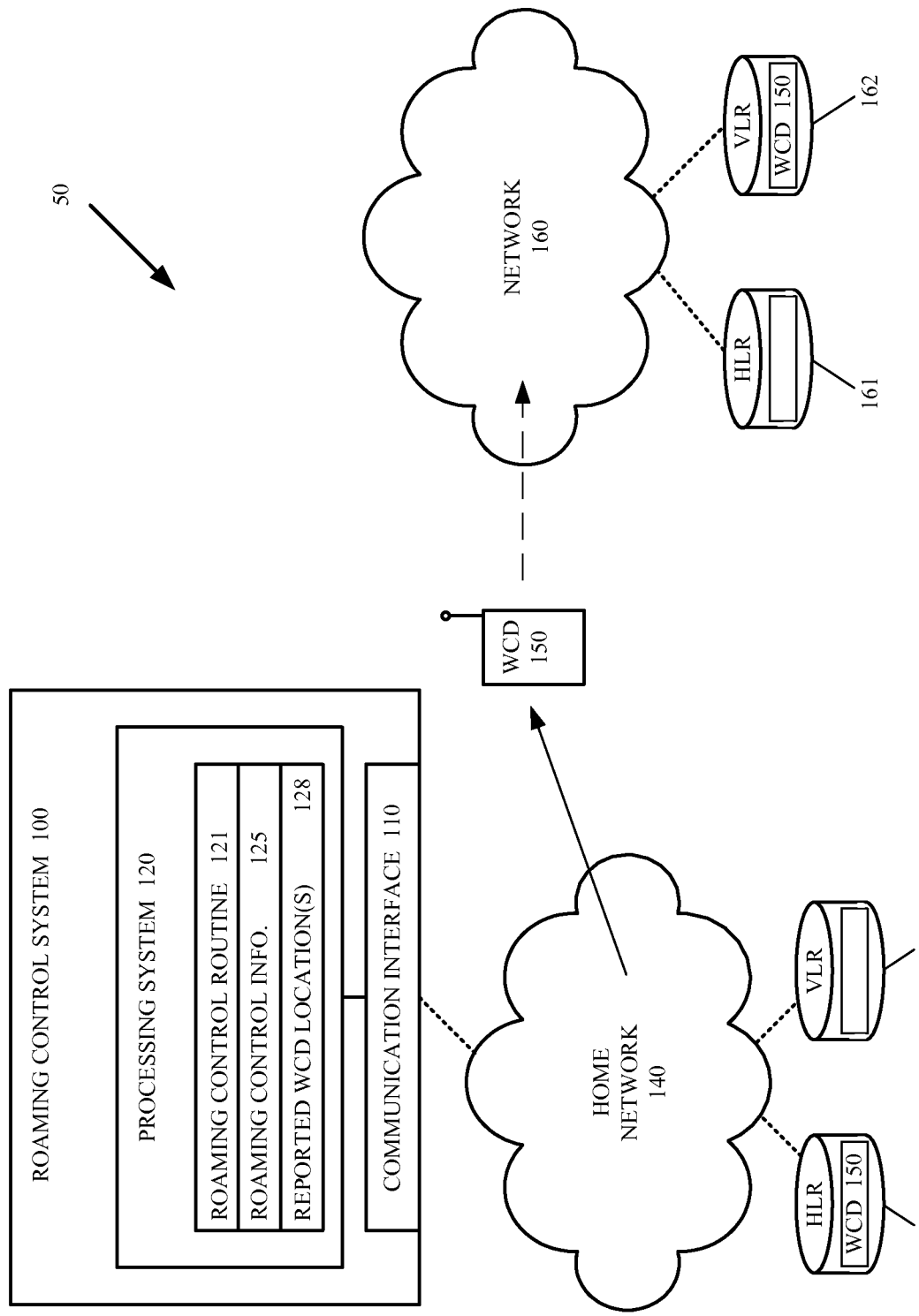
FIG. 1 shows an exemplary roaming environment including an exemplary roaming control system.

FIG. 1 shows an exemplary roaming environment 50 including an exemplary roaming control system 100. The roaming environment 50 in the example shown includes a home wireless access network 140, a wireless communication device (WCD) 150, and a second (i.e., visited) wireless access network 160. The home wireless access network 140 includes the roaming control system 100. The home wireless access network 140 is the network where the WCD 150 is registered.

In the figure, the WCD 150 has left the home network 110 and has roamed into the visited wireless access network 160. Roaming is an extension of connectivity service into a location different from the home location where the service was registered. During roaming, the WCD 150 can make and receive voice calls, send and receive data, or access other services, including home data services, through the visited wireless access network 160.

The visited wireless access network 160 may be adjacent to the home wireless access network 140. The visited wireless access network 160 may be geographically near to the home wireless access network 140. Alternatively, the visited wireless access network 160 may be remote from the home wireless access network 140, including the visited wireless access network 160 being located in other geographic regions, countries, or even on other continents from the home wireless access network 140.

Roaming may present problems. The roaming WCD 150 may have difficulty finding a compatible or accessible roaming network. The roaming WCD 150 may have difficulty in interfacing and operating with the visited wireless access network 160 and may require information about appropriate protocols, formats, language, or other characteristics of the visited wireless access network 160. The visited wireless access network 160 may not want to grant access to an unknown roaming WCD 150. The roaming WCD 150 may have difficulty in gaining access to the visited wireless access network 160 if the roaming WCD 150 is not properly identified or validated by the visited wireless access network 160. The roaming WCD 150 may have difficulty handing-off from a first visited wireless access network 160 to a second visited wireless access network 160.

Additionally, another problem is that the home wireless access network 140 may lose track of the roaming WCD 150. If the home wireless access network 140 is not aware of which other network the WCD 150 is currently within, then the home wireless access network 140 cannot successfully exchange communications with the WCD 150. The visited wireless access network 160 may not report a location of an unknown roaming WCD 150 to the home wireless access network 140. The visited wireless access network 160 may not relay communications from the roaming WCD 150 to the home wireless access network 140. The visited wireless access network 160 may not receive or accept communications received from the home wireless access network 140 and destined for the roaming WCD 150.

The home wireless access network 140 includes a Home Location Register (HLR) 141. The HLR 141 comprises a database of all WCDs registered with the home wireless access network 140. The HLR 141 can receive and store an identifier that is unique to the WCD 150. The WCD 150 will be included in the HLR 141 for as long as the WCD 150 is registered to the home wireless access network 140. The WCD 150 will be included in the HLR 141 even when the WCD 150 is roaming and when the WCD 150 leaves the home wireless access network 140, the HLR 141 will continue to include an entry for the WCD 150.

The home wireless access network 140 includes a Visitor Location Register (VLR) 142. The VLR 142 comprises a database of WCDs that are currently operating within the home wireless access network 140. The VLR 142 lists every home and visitor WCD currently operating within the home wireless access network 140. In the example shown, a listing for the WCD 150 would have been removed as soon as the WCD 150 left the home wireless access network 140.

Similar to the home wireless access network 140, the visited wireless access network 160 includes a HLR 161 and a VLR 162. When the WCD 150 enters the visited wireless access network 160, the visited wireless access network 160 receives an identifier of the WCD 150. Because the HLR 161 of the visited wireless access network 160 does not list the WCD 150 in its HLR 161, the visited wireless access network 160 determines that the WCD 150 is a visitor and lists the roaming WCD 150 in its VLR 162. The visited wireless access network 160 will attempt to find the home network of the WCD 150 using the identifier of the roaming WCD 150. The visited wireless access network 160 will communicate with the home wireless access network 140. The home wireless access network 140 will provide information regarding the WCD 150 that the visited wireless access network 160 will use while the roaming WCD 150 is within the visited wireless access network 160. Further, the visited wireless access network 160 will add an entry to the VLR 162 for the WCD 150.

The roaming control system 100 can ping the WCD 150 when the WCD 150 is roaming. The ping can be directly generated and transmitted by the roaming control system 100. Alternatively, the roaming control system 100 can cause another portion or component of the home wireless access network 140 to generate and transmit the ping to the roaming WCD 150.

The ping comprises a communication that is sent to provoke a response. The response to a ping is important in terms of whether it is received or not received. The ping in some examples comprises a ping according to the Short Message Service (SMS) protocol. The SMS protocol comprises a text communication protocol wherein fixed line or mobile telephone devices can exchange short text messages via a telephone signaling channel. The ping can comprise a text message ping. The ping can comprise a world-wide text message ping, such as during travels. The ping can comprise a silent ping that is not communicated to the user of the recipient WCD. The ping can comprise a ping according to an international paging protocol. In addition, computerized devices using various internet protocols or other digital communication protocols can also send and receive SMS messages. However, the ping can comprise a ping in any suitable communication protocol. It should be understood that the above listing is not exhaustive and any suitable ping can be employed.

The roaming control system 100 in the example shown includes a communication interface 110 and a processing system 120 coupled to the communication interface 110. The communication interface 110 is configured to exchange communications with the WCD 150 and with other wireless access networks. The processing system 120 includes a roaming control routine 121, roaming control information 125, and one or more reported WCD locations 128. Other routines, values, or data can be included in the processing system 120 but are omitted for clarity.

The roaming control routine 121 facilitates the roaming of the WCD 150. The roaming control routine 121 controls and facilitates the international roaming of the WCD 150.

The roaming control routine 121 is executed by the processing system 120 and directs the roaming control system 100 to perform roaming control processes. The roaming control routine 121 directs the roaming control system 100 to track the roaming WCD 150. The roaming control routine 121 directs the roaming control system 100 to find the roaming WCD 150 when the location of the roaming WCD 150 is uncertain or unknown. The roaming control routine 121 directs the roaming control system 100 to provide the roaming control information 125 to visited networks on behalf of the roaming WCD 150.

The roaming control information 125 comprises information provided by the roaming control system 100 to the visited wireless access network 160. The roaming control information 125 comprises identification information for the roaming WCD 150 and/or for the home wireless access network 140. The roaming control information 125 comprises contract information regarding roaming contracts that are existing between the home wireless access network 140 and one or more roaming partner networks. The roaming control information 125 comprises a reported destination of the roaming WCD 150. The roaming control information 125 comprises information about past movements of the roaming WCD 150. The roaming control information 125 comprises predicted future movements of the roaming WCD 150. The roaming control information 125 comprises contact information for the home wireless access network 140 in order to facilitate a communications exchange between the home wireless access network 140 and the visited network or networks. It should be understood that the roaming control information 125 can include other or additional information that can facilitate the roaming of the WCD 150. Further, the roaming control system 100 can include roaming control information for multiple WCDs.

The one or more reported WCD locations 128 comprise reported locations of the roaming WCD 150. The one or more reported WCD locations 128 comprise WCD roaming locations reported by one or more visited networks. The one or more reported WCD locations 128 comprise WCD roaming locations reported by the roaming WCD 150. The one or more reported WCD locations 128 can comprise the identifiers of visited networks (or other location information) when the roaming WCD 150 contacts other networks and the visited network in turn contacts the home wireless access network 140. The number of entries or location values in the one or more reported WCD locations 128 therefore can depend on the movements of the roaming WCD 150. The one or more reported WCD locations 128 enable tracking of the roaming WCD 150 and enable prediction of where the roaming WCD 150 might be if the roaming control system 100 needs to search for the roaming WCD 150.

The roaming control routine 121 when executed by the roaming control system 100 in general or the processing system 120 in particular operates to direct the roaming control system 100 or the processing system 120 to ping the roaming WCD at predetermined time intervals, if the ping was successful, record a WCD roaming location using a ping response, if the ping was successful, provide WCD roaming control information to a visited wireless access network where the roaming WCD is currently located, and if the ping was unsuccessful, then broaden a search scope and repeat the pinging.

Figure 2:
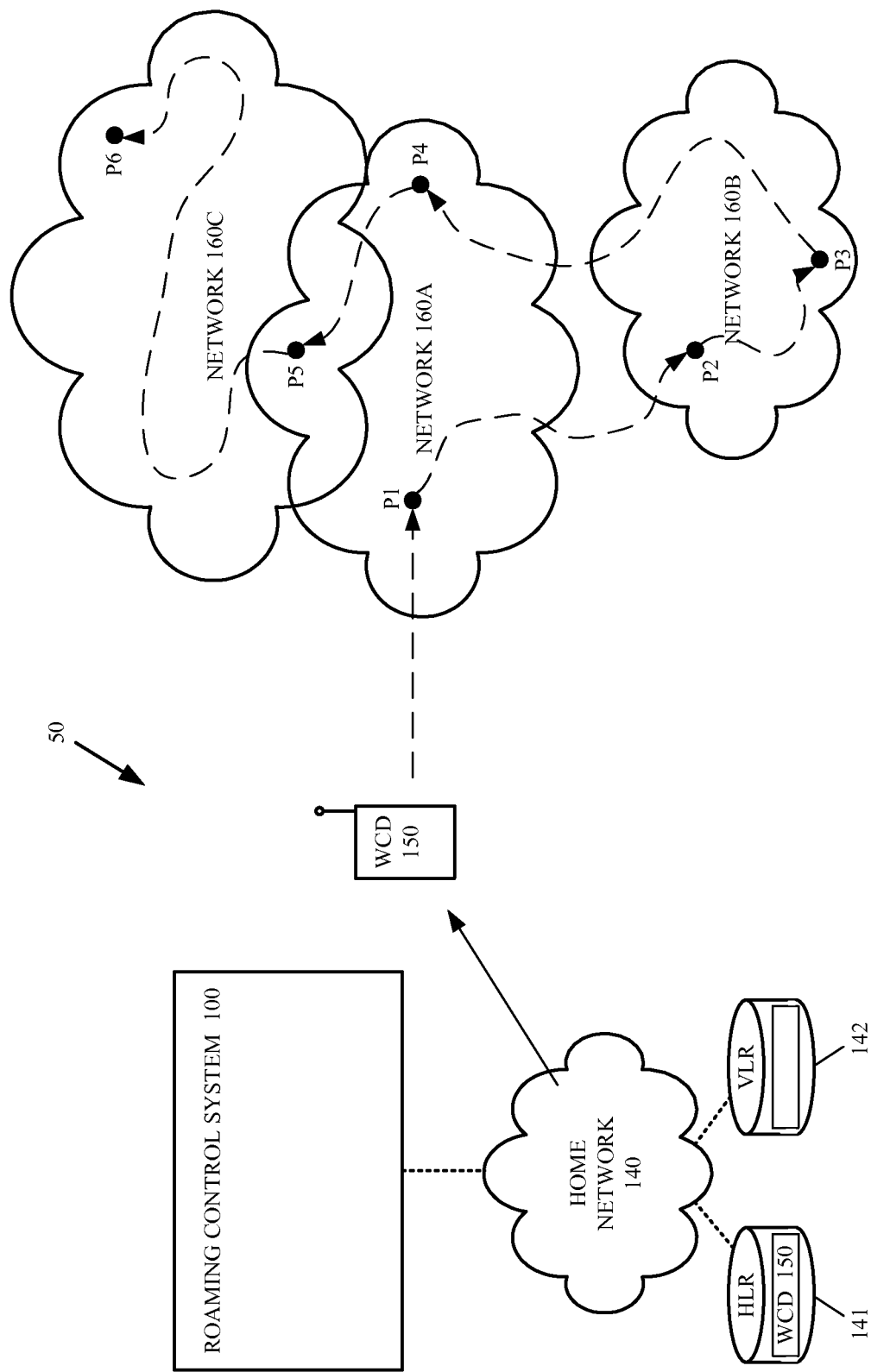
FIG. 2 shows the roaming environment wherein a roaming Wireless Communication Device (WCD) is roaming in three visited networks.

FIG. 2 shows the roaming environment 50 wherein the roaming WCD 150 is roaming in three visited networks 160A, 160B, and 160C. In the example shown, the roaming WCD 150 leaves the home wireless access network 140 and travels to point P1 in the network 160A (i.e., a first visited network). The point P1 represents a location that the roaming WCD 150 passes through or spends time at, such as an overnight stop, for example.

When the roaming WCD 150 arrives in the first visited network 160A (such as at the point P1 or before reaching the point P1), the roaming WCD 150 must negotiate service with the first visited network 160A. The first visited network 160A will receive an identifier from the roaming WCD 150. The first visited network 160A will attempt to find a HLR entry for the roaming WCD 150, but will not find a HLR entry because the first visited network 160A is not the home network of the roaming WCD 150. The first visited network 160A will add the roaming WCD 150 to its VLR if the first visited network 160A grants access to the roaming WCD 150.

The roaming WCD 150 then leaves the first visited network 160A and travels to the second visited network 160B, visiting or stopping at points P2 and P3 in the second visited network 106B. The roaming WCD 150 then returns to the first visited network 106A, visiting or stopping at points P4 and P5. The point P5 is in a geographic region covered by both the first visited network 160A and the third visited network 160C. The roaming WCD 150 then moves into the third visited network 106C and travels to the point P6.

The home wireless access network 140 can lose track of the location of the roaming WCD 150. The home wireless access network 140 can lose track of the roaming WCD 150 when the roaming WCD 150 travels through a region of limited or no network coverage, such as the geographic region between the first visited network 160A and the network second visited 160B. The home wireless access network 140 can lose track of the roaming WCD 150 if any one of the visited networks 160A-160C does not contact the home wireless access network 110 and provide information about the roaming WCD 150. The home wireless access network 140 can lose track of the roaming WCD 150 if a visited network 160 does not provide information to the home wireless access network 140 about the roaming WCD 150. If the home wireless access network 140 loses contact with the roaming WCD 150 at the point P5 in the first visited network 160A, for example, then the home wireless access network 140 will be unaware of the location of the roaming WCD 150 when the roaming WCD 150 leaves the first visited network 160A and travels into the third visited network 160C.

Figure 3:
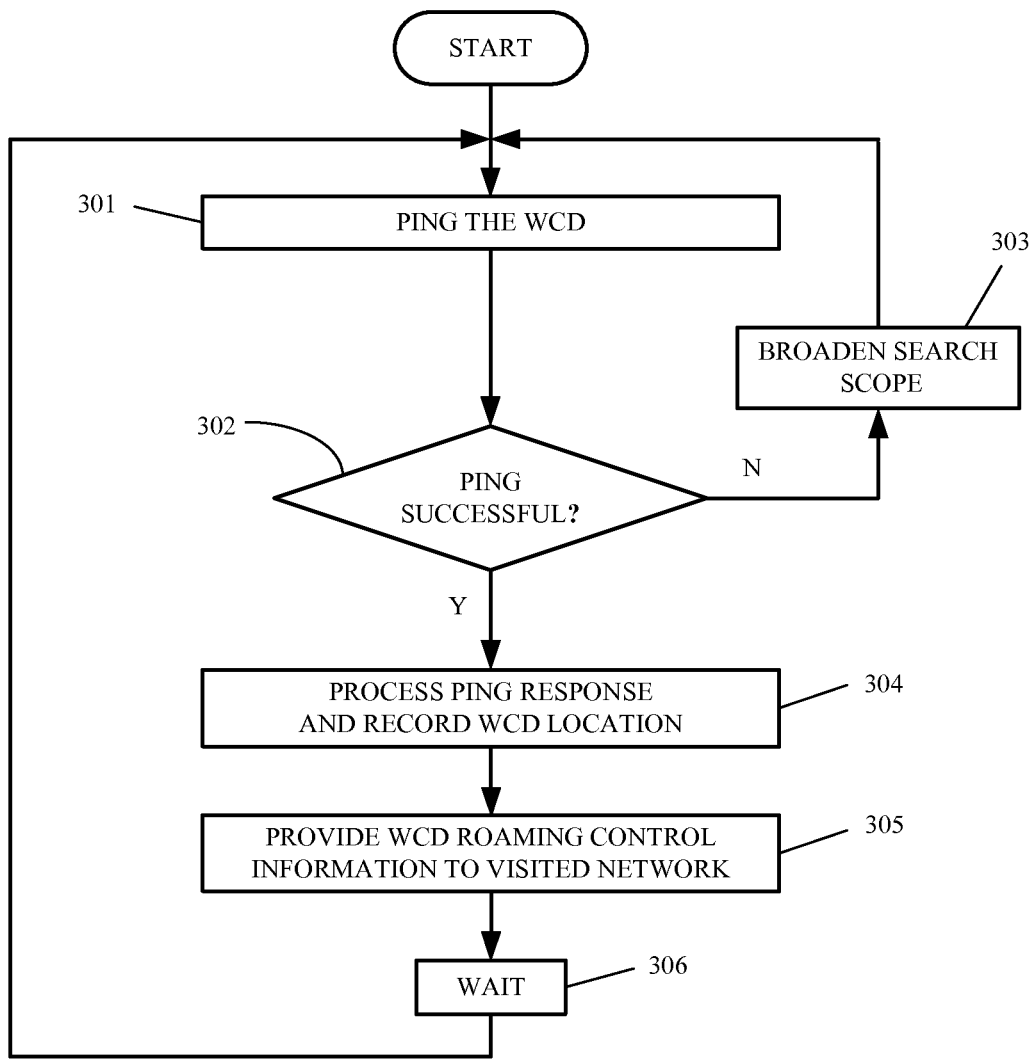
FIG. 3 shows a flowchart of an exemplary roaming control method for a roaming WCD while roaming away from a home wireless access network.

FIG. 3 shows a flowchart 300 of an exemplary roaming control method for a roaming WCD while roaming away from a home wireless access network. In step 301, the roaming control system pings the roaming WCD at predetermined time intervals. The predetermined time intervals can comprise days, hours, or any other time interval designed to help locate and track the movements of the roaming WCD. The ping is sent to the WCD in order to elicit a response from the roaming WCD. The response to a ping can include providing visited network location information for a visited network where the roaming WCD is currently located. The response to a ping can include geographic location information for a visited network where the roaming WCD is currently located. Therefore, a ping message may be used to locate the roaming WCD.

In step 302, if the ping is successful (i.e., a response is received to the ping), then the method proceeds to step 304. Otherwise, if the ping is not successful (i.e., a valid or responsive communication is not received in response to a ping), then the method proceeds to step 303.

In step 303, where the ping was not successful, the roaming control system broadens a search scope and repeats the pinging, branching back to step 301. The broadening can comprise pinging more than one network. The pinging can comprise pinging multiple networks. The pinging can comprise pinging some or all networks identified in a destination provided by the WCD or user of the WCD. The pinging can comprise pinging one or more of the one or more visited wireless access networks that include a last known WCD roaming location, the one or more visited wireless access networks that are adjacent to a last known WCD roaming location, the one or more visited wireless access networks projected from a last known WCD roaming location, a received WCD destination, or one or more roaming partners.

In step 304, where the ping was successful, the roaming control system processes the ping response and determines a WCD roaming location. The roaming control system records the WCD roaming location, such as in the stored WCD locations of FIG. 2, for example.

In step 305, the roaming control system provides WCD roaming control information to the visited network. The roaming control system provides the WCD roaming control information in order to facilitate the interactions between the WCD and the visited network. The WCD roaming control information can include permitted service/access information that delineates the services and access that the WCD is permitted to exercise while roaming in the visited network. The WCD roaming control information can include a received destination of the WCD. The WCD roaming control information can include projected destinations of the roaming WCD. The WCD roaming control information can include projected other networks that the WCD might visit.

In step 306, the method may optionally wait a predetermined time interval before looping back to step 301 and iteratively pinging the WCD again.

Figure 4:
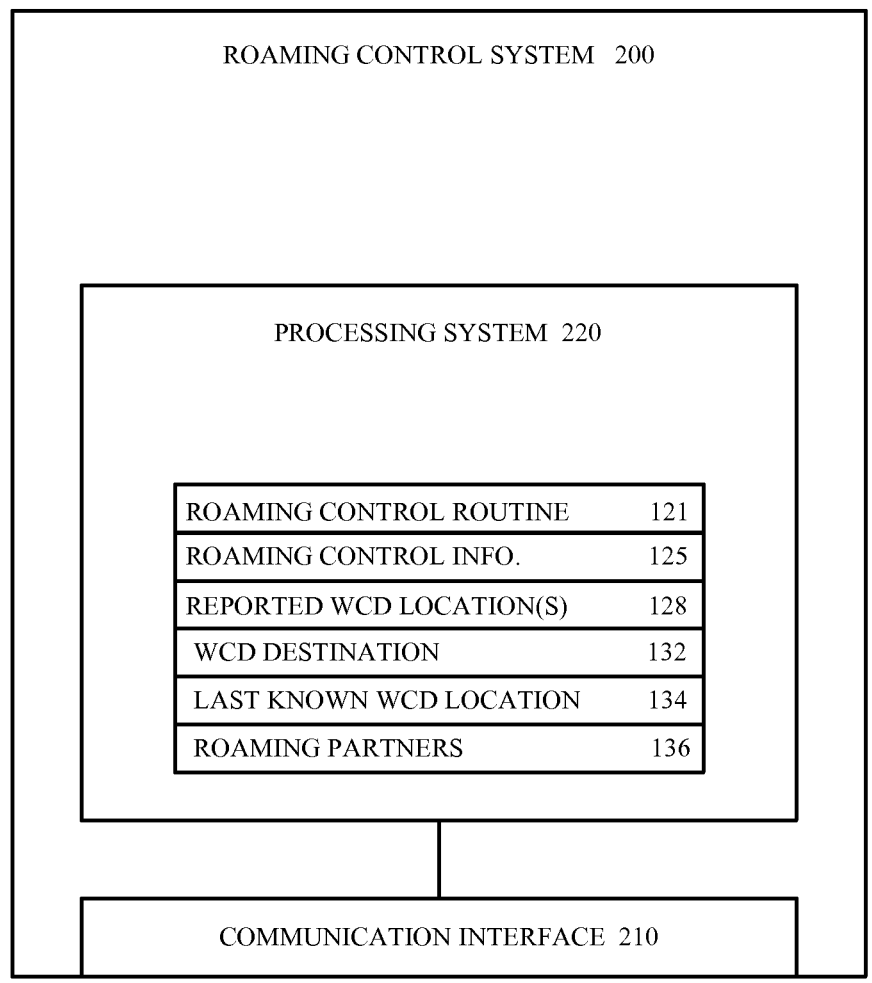
FIG. 4 shows an exemplary roaming control system for the roaming WCD.

FIG. 4 shows an exemplary roaming control system 200 for the roaming WCD 150. The roaming control system 200 is an example of the roaming control system 100 of FIG. 1. The roaming control system 100 of FIG. 1 can be the same as or different from the roaming control system 200 of FIG. 2. In addition to the routines and data previously discussed, the processing system 120 in this example can store a received WCD destination 132, a last known WCD location 134, and one or more roaming partners 136.

The WCD destination 132 comprises a destination of the roaming WCD 150. The WCD destination 132 is received in the roaming control system 200, such as from the WCD 150. The WCD roaming destination can comprise one or more other networks. The WCD roaming destination can comprise one or more other geographic regions outside of the region of the home network. The WCD destination 132 can comprise information regarding one or more networks that the user of the roaming WCD 150 anticipates encounter and using while roaming. The WCD destination 132 can be provided by the user in advance of the roaming, or can be requested by the roaming control system 100 when the roaming control system 100 determines that the WCD 150 is roaming. The WCD destination 132 can be used for searching if the location of the roaming WCD 150 becomes unknown. The WCD destination 132 can be used for determining other networks to search for the presence of the roaming WCD 150.

The last known WCD location 134 comprises a stored last known location of the roaming WCD 150. The last known WCD location 134 can therefore comprise a last reported location of the roaming WCD 150, with the reported location coming from a visited network.

The one or more roaming partners 136 comprise a listing of other wireless access networks where the roaming WCD 150 should have access privileges. In some examples, the home wireless access network 140 will have a roaming agreement with one or more of the visited wireless access networks 160 (and potentially with multiple other networks). The one or more roaming partners 136 therefore comprises a list of roaming partners. In addition, the one or more roaming partners 136 can include information such as billing rates, billing procedures, and the types of communication services that are allowed for the roaming WCD 150, for example.

The roaming control routine 121 when executed by the roaming control system 100 in general or the processing system 120 in particular operates to direct the roaming control system 100 or the processing system 120 to receive a destination of the roaming WCD, ping the roaming WCD at predetermined time intervals, if the ping was successful, record a WCD roaming location using a ping response, if the ping was successful, provide WCD roaming control information to a visited wireless access network where the roaming WCD is currently located, and if the ping was unsuccessful, then broaden a search scope and repeat the pinging.

Figure 5:
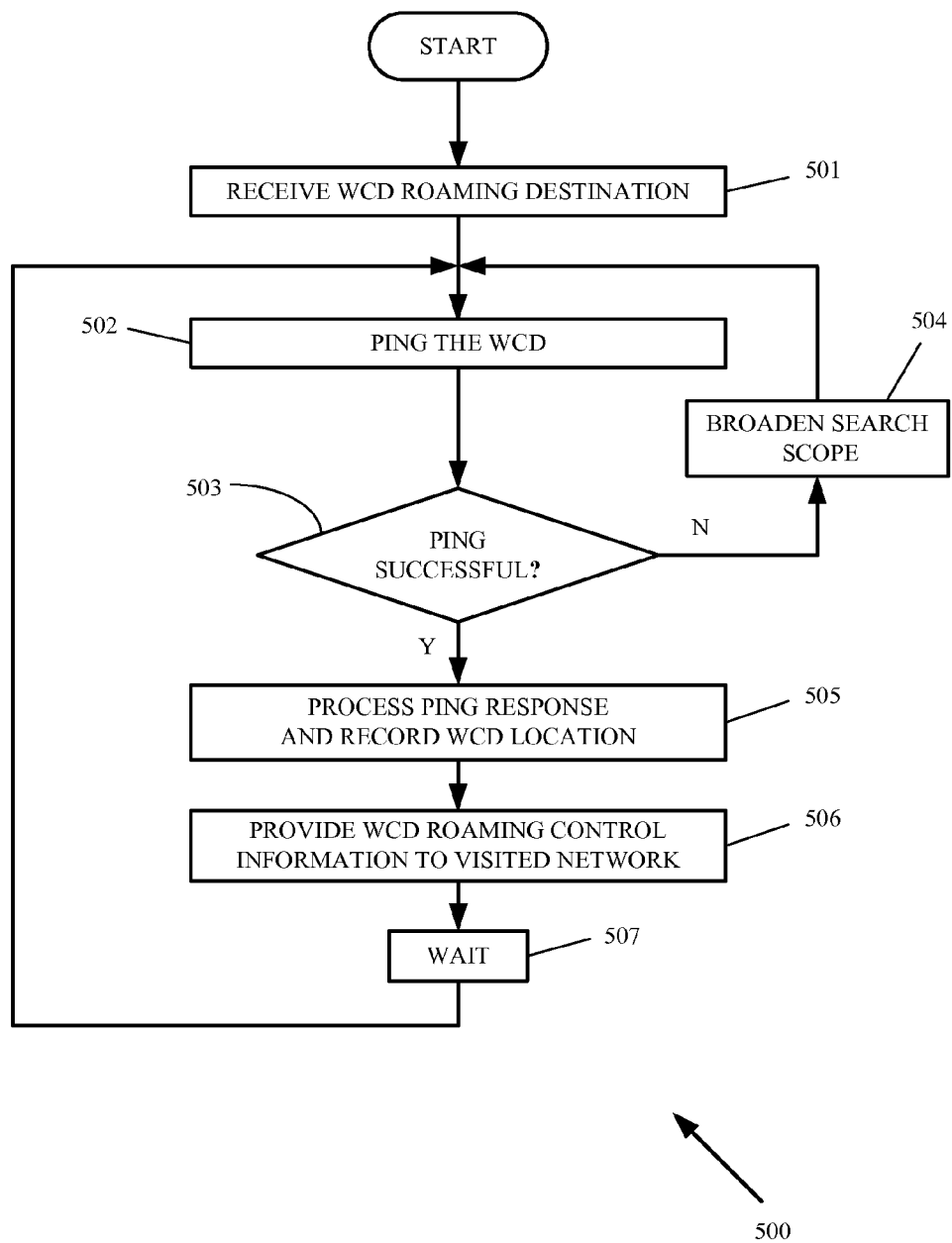
FIG. 5 is a flowchart of an exemplary roaming control method for a roaming WCD.

FIG. 5 is a flowchart 500 of an exemplary roaming control method for a roaming WCD. In step 501, a WCD destination is received in the roaming control system, such as from the roaming WCD, as previously discussed.

In step 502, the roaming control system pings the roaming WCD at predetermined time intervals, as previously discussed.

In step 503, if the ping is successful (i.e., a response is received to the ping), then the method proceeds to step 505. Otherwise, if the ping is not successful (i.e., a valid or responsive communication is not received in response to a ping), then the method proceeds to step 504.

In step 504, where the ping was not successful, the roaming control system broadens a search scope and repeats the pinging, as previously discussed. Because the ping was unsuccessful, the method branches back to step 502.

In step 505, where the ping was successful, the roaming control system processes the ping response and determines a WCD roaming location, as previously discussed. The roaming control system records the location, such as in the reported WCD locations of FIGS. 1 and 4, for example.

In step 506, the roaming control system provides WCD roaming control information to the visited network that is included in the received ping response, as previously discussed.

In step 507, the method may optionally wait a predetermined time interval before looping back to step 502 and iteratively pinging the WCD again.

Referring to any of FIGS. 1, 2, and 4, the roaming environment in the examples can provide roaming communication services including voice calls, text messages, data access, or other communication services provided over cellular or wireless communication networks. In some examples, the roaming environment includes equipment to provide wireless access to WCDs within different coverage areas, route communications between content providers and WCDs, and facilitate handoffs between equipment of different coverage areas, among other operations.

The roaming environment can include one or more wireless access networks. The one or more wireless access networks may be coupled together by communication links. The one or more wireless access networks may be further coupled to other devices or networks, including telephone landlines or Internet links, for example. As a result, communications exchanged between the WCD and a wireless access network may be further provided to other devices within the roaming environment.

Referring to any of FIGS. 1, 2, and 4, a wireless access network comprises a LTE, LTE Advanced, or Evolved Universal Terrestrial Radio Access (EUTRA) wireless access network in some examples. A wireless access network can comprise a High Rate Packet Data (HRPD) or an evolved High Rate Packet Data (eHRPD) network, a Global System for Mobile communications (GSM) network, a Universal Mobile Telecommunications System (UMTS) network, a Code Division Multiple Access (CDMA) network, an Enhanced Voice-Data Optimized (EV-DO) network, a single-carrier radio transmission technology link (1xRTT) network, a High Speed Packet Access (HSPA) network, a Radio Link Protocol (RLP) network, a Worldwide Interoperability for Microwave Access (WiMAX) network, an Orthogonal Frequency-Division Multiple Access (OFDMA) network, a Single-Carrier Frequency-Division Multiple Access (SC-FDMA) network, a Wideband Code Division Multiple Access (W-CDMA) network, a Time Division Synchronous Code Division Multiple Access (TD-SCDMA) network, an IEEE 802.11 network, a Wireless Fidelity (Wi-Fi) network, or some other cellular or wireless communication format, including combinations, improvements, or variations thereof. However, the above examples are illustrative and are not exhaustive. Other wireless access networks are contemplated and are within the scope of the description and claims. Further, the examples above apply equally well to improvements and enhancements of current wireless access networks.

Referring to any of FIGS. 1, 2, and 4, the roaming control system in the examples includes processing equipment, routing equipment, physical structures, and can also include transceiver equipment, antenna equipment, and other equipment. It should be understood that the roaming control system could be distributed or consolidated among equipment or circuitry that together forms the elements of the roaming control system. Further equipment, networks, and systems can be communicatively coupled to the roaming control system, such as equipment, networks, and systems of cellular voice and data communication systems, but are omitted from the figures for clarity.

The wireless access networks in the examples can include elements such as radio access network (RAN) equipment, eNodeB equipment, Mobility Management Entity (MME) equipment, Home Subscriber Servers (HSS), Evolved Universal Terrestrial Radio Access (E-UTRA) network equipment, a base station (BS), a base transceiver station (BTS), a base station controller (BSC), a mobile switching center (MSC), a home location register (HLR), a radio node controller (RNC), a call processing system, authentication, authorization and accounting (AAA) equipment, an access service network gateway (ASN-GW), a packet data switching node (PDSN), a home agent (HA), a mobility access gateway (MAG), an Internet access node, a telephony service node, a database, or other communication and control equipment.

The WCD and the wireless access networks comprise communication circuitry and software to support one or more wireless protocols, such as LTE, CDMA, GSM, EVDO, and HSPA. The WCD and the wireless access networks typically also comprise communication circuitry and software to support one or more data protocols, such as IP, Ethernet, packet voice, and the like. The wireless access networks may have backhaul connectivity to one or more core networks over various wired and/or wireless data connections.

Referring to any of FIGS. 1, 2, and 4, the roaming WCD can comprise a mobile device, including a cellular phone, but also may include other devices. The roaming WCD can comprise subscriber equipment, customer equipment, an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof. The WCD may be integrated within other systems and devices, such as vehicles, appliances, apparel, and the like.

The WCD in the examples receive wireless access to communication services through the wireless access networks. The communication services can include voice calls, text messaging, data exchange, multimedia streaming, and the like. The WCD can include one or more transceiver portions for communication over one or more wireless links of differing frequency bands. The WCD can receive wireless access information from one or more wireless access nodes, such as beacon signals, channel information, frequency information, overhead signaling, neighbor lists, and the like. The WCD can move among any of the coverage areas associated with the wireless communication environment and receive wireless access.

Referring to any of FIGS. 1, 2, and 4, the communication interface in the examples comprises a network card, network interface, port, or interface circuitry that allows the roaming control system to communicate with other communication devices over a variety of networks. The communication interface may also include a memory device, software, processing circuitry, or some other device. The communication interface may use various communication protocols, such as time division multiplex, internet, Ethernet, wireless, or some other communication format—including combinations thereof—to exchange communications as described herein for communication devices, such as anonymity factor and changes to the anonymity factor and mobility data.

The communication interface in the examples comprises an interface for communicating with one or more WCDs. The communication interface receives command and control information and instructions from the processing system for controlling the operations of the communication interface and the WCD over wireless links, coordinating handoffs of the WCD between other wireless access systems, exchanging authentication or authorization information with other wireless access networks, providing parameters to one or more WCDs, transferring neighbor list information, and transferring communications for delivery to a WCD. The wireless link can use various protocols or communication formats as described herein, including combinations, variations, or improvements thereof.

The processing system in the examples can comprise one or more microprocessors and other circuitry that retrieves and executes the roaming control routine. The processing system can be implemented within a single processing device but can also be distributed across multiple processing devices or sub-systems that cooperate in executing program instructions. Examples of the processing system include general purpose central processing units, application specific processors, and logic devices, as well as any other type of processing device, combinations, or variations thereof. In some examples, the processing system includes a computer readable storage media capable of storing the roaming control routine. The processing system can include volatile and nonvolatile, removable and non-removable media implemented in any method or technology for storage of information, such as computer readable instructions, data structures, program modules, or other data.

In addition to storage media, in the examples the processing system can also include communication media over which the roaming control routine can be communicated. The processing system can be implemented to include a single storage device but can also be implemented to include multiple storage devices or sub-systems co-located or distributed relative to each other. The processing system can comprise additional elements, such as a controller, capable of communicating with the storage media. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In general, the roaming control routine can, when loaded into the processing system and executed, transform the processing system into a special-purpose computing system configured to facilitate roaming operations, among other operations. Encoding the roaming control routine on the processing system can transform the physical structure of the processing system. The specific transformation of the physical structure can depend on various factors in different implementations of this description. Examples of such factors can include, but are not limited to the technology used to implement the storage media of the processing system and whether the computer-storage media are characterized as primary or secondary storage. For example, if the computer-storage media are implemented as semiconductor-based memory, the roaming control routine can transform the physical state of the semiconductor memory when the program is encoded therein. For example, the roaming control routine can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The roaming control routine in the examples comprises computer programs, firmware, or some other form of machine-readable processing instructions. The roaming control routine may include an operating system, utilities, drivers, network interfaces, applications, virtual machines, or some other type of software. The roaming control routine can include additional processes, programs, or components, such as operating system software, database software, or application software. The roaming control routine can also comprise firmware or some other form of machine-readable processing instructions executable by the processing system.

The roaming control routine in the examples can include additional processes, programs, or components, such as operating system software, database software, or application software. The roaming control routine can also comprise firmware or some other form of machine-readable processing instructions executable by the processing system.

Many aspects of the disclosure can be better understood with reference to the drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A roaming control system for a roaming Wireless Communication Device (WCD) while roaming away from a home wireless access network, comprising:
a communication interface configured to exchange communications with the WCD and with other wireless access networks; and
a processing system coupled to the communication interface, with the processing system configured to ping the roaming WCD at predetermined time intervals, if the ping was successful, record a WCD roaming location using a ping response, if the ping was successful, provide WCD roaming control information to a visited wireless access network where the roaming WCD is currently located, wherein the WCD roaming control information comprises information about at least one of a predicted future movement of the roaming WCD or a reported destination of the roaming WCD provided by a user in advance to roaming, and if the ping was unsuccessful, then broaden a search scope and repeat the pinging.

2. The roaming control system of claim 1, with the processing system further configured to receive a destination of the roaming WCD.

3. The roaming control system of claim 1, with the processing system further configured to ping the roaming WCD based on one or more of a reported WCD destination, past movements of the roaming WCD, a last known WCD roaming location, or one or more roaming partners.

4. The roaming control system of claim 1, wherein if the ping was unsuccessful, with the processing system further configured to provide WCD roaming control information to a visited wireless access network where the roaming WCD is currently located, wherein the WCD roaming control information confirms that the roaming WCD is authorized to access the visited wireless access network.

5. The roaming control system of claim 1, wherein if the ping was unsuccessful, with the processing system further configured to provide WCD roaming control information to a visited wireless access network where the roaming WCD was last located, wherein the WCD roaming control information confirms that the roaming WCD is authorized to access the visited wireless access network.

6. The roaming control system of claim 1, wherein if the ping was unsuccessful, with the roaming control system providing WCD roaming control information to one or more roaming partners, wherein the WCD roaming control information confirms that the roaming WCD is authorized to access the one or more roaming partners.

7. The roaming control system of claim 1, with the processing system further configured to broaden the search scope comprising pinging one or more of one or more visited wireless access networks that include a last known WCD roaming location, one or more visited wireless access networks that are adjacent to a last known WCD roaming location, one or more visited wireless access networks projected from a last known WCD roaming location, a received WCD destination, or one or more roaming partners.

8. A roaming control method for a roaming Wireless Communication Device (WCD) while roaming away from a home wireless access network, comprising:
in a roaming control system of the home wireless access network, pinging the roaming WCD at predetermined time intervals;
in the roaming control system, if the ping was successful, recording a WCD roaming location using a ping response;
in the roaming control system, if the ping was successful, providing WCD roaming control information to a visited wireless access network where the roaming WCD is currently located, wherein the WCD roaming control information comprises information about at least one of a predicted future movement of the roaming WCD or a reported destination of the roaming WCD provided by a user in advance to roaming; and
in the roaming control system, if the ping was unsuccessful, then broadening a search scope and repeating the pinging.

9. The roaming control method of claim 8, further comprising, in the roaming control system, receiving a destination of the roaming WCD.

10. The roaming control method of claim 8, with the pinging further comprising pinging the roaming WCD based on one or more of a reported WCD destination, past movements of the roaming WCD, a last known WCD roaming location, or one or more roaming partners.

11. The roaming control method of claim 8, wherein if the ping was unsuccessful, with the roaming control system providing WCD roaming control information to a visited wireless access network where the roaming WCD is currently located and wherein the WCD roaming control information confirms that the roaming WCD is authorized to access the visited wireless access network.

12. The roaming control method of claim 8, wherein if the ping was unsuccessful, with the roaming control system providing WCD roaming control information to a visited wireless access network where the roaming WCD was last located and wherein the WCD roaming control information confirms that the roaming WCD is authorized to access the visited wireless access network.

13. The roaming control method of claim 8, wherein if the ping was unsuccessful, with the roaming control system providing WCD roaming control information to one or more roaming partners and wherein the WCD roaming control information confirms that the roaming WCD is authorized to access the one or more roaming partners.

14. The roaming control method of claim 8, with broadening the search scope comprising pinging one or more of one or more visited wireless access networks that include a last known WCD roaming location, one or more visited wireless access networks that are adjacent to a last known WCD roaming location, one or more visited wireless access networks projected from a last known WCD roaming location, a received WCD destination, or one or more roaming partners.

15. A roaming control method for a roaming Wireless Communication Device (WCD) while roaming away from a home wireless access network, comprising:
in a roaming control system of the home wireless access network, receiving a destination of the roaming WCD;
in the roaming control system, pinging the roaming WCD at predetermined time intervals;
in the roaming control system, if the ping was successful, recording a WCD roaming location using a ping response;
in the roaming control system, if the ping was successful, providing WCD roaming control information to a visited wireless access network where the roaming WCD is currently located, wherein the WCD roaming control information comprises information about at least one of a predicted future movement of the roaming WCD or a reported destination of the roaming WCD provided by a user in advance to roaming; and in the roaming control system, if the ping was unsuccessful, then broadening a search scope and repeating the pinging.

16. The roaming control method of claim 15, with the pinging further comprising pinging the roaming WCD based on one or more of a reported WCD destination, past movements of the roaming WCD, a last known WCD roaming location, or one or more roaming partners.

17. The roaming control method of claim 15, wherein if the ping was unsuccessful, with the roaming control system providing WCD roaming control information to a visited wireless access network where the roaming WCD was last located and wherein the WCD roaming control information confirms that the roaming WCD is authorized to access the visited wireless access network.

18. The roaming control method of claim 15, wherein if the ping was unsuccessful, with the roaming control system providing WCD roaming control information to one or more roaming partners and wherein the WCD roaming control information confirms that the roaming WCD is authorized to access the one or more roaming partners.

19. The roaming control method of claim 15, with broadening the search scope comprising pinging one or more of one or more visited wireless access networks that include a last known WCD roaming location, one or more visited wireless access networks that are adjacent to a last known WCD roaming location, one or more visited wireless access networks projected from a last known WCD roaming location, pinging a received WCD destination, or one or more roaming partners.

* * * * *